(12) United States Patent
Nogaki

(10) Patent No.: US 6,923,457 B2
(45) Date of Patent: Aug. 2, 2005

(54) HAND TRUCK CONVERTIBLE BETWEEN FORWARD AND SIDEWAYS DISPLACEMENT

(76) Inventor: Hisami Nogaki, 6465 E. Camino Grande, Anaheim Hills, CA (US) 92807

( * ) Notice: Subject to any disclaimer, the term of this patent is extended or adjusted under 35 U.S.C. 154(b) by 22 days.

(21) Appl. No.: 10/630,614

(22) Filed: Jul. 30, 2003

(65) Prior Publication Data

US 2005/0023782 A1 Feb. 3, 2005

(51) Int. Cl.$^7$ .................................................. B62B 1/00
(52) U.S. Cl. .............................. 280/47.27; 280/47.29; 280/40
(58) Field of Search ........................ 280/47.27, 47.28, 280/47.11, 47.131, 47.17, 47.18, 47.24, 47.29, 280/47.34, 40, 647, 646; 414/444, 490

(56) References Cited

U.S. PATENT DOCUMENTS

| | | | |
|---|---|---|---|
| 394,385 A | 12/1888 | McMillin | |
| 2,721,668 A | 10/1955 | Elsner | |
| 2,797,927 A * | 7/1957 | Raff | 280/40 |
| 2,800,336 A | 7/1957 | Major et al. | |
| 2,884,257 A | 4/1959 | Menne | |
| 3,166,339 A | 1/1965 | Earley | |
| 3,269,744 A | 8/1966 | Dobson | |
| 3,666,285 A | 5/1972 | Fertig | |
| 3,729,209 A | 4/1973 | Litz | |
| 4,155,527 A | 5/1979 | Sjoberg | |
| 4,315,632 A * | 2/1982 | Taylor | 280/40 |
| 4,460,189 A | 7/1984 | Goff | |
| 4,488,733 A | 12/1984 | Hellsten | |
| 4,614,349 A * | 9/1986 | Wenzel | 280/47.29 |
| 4,630,838 A | 12/1986 | Stockton | |
| 4,900,044 A | 2/1990 | Whitley | |
| 4,943,073 A * | 7/1990 | Wander | 280/47.27 |
| 5,120,072 A * | 6/1992 | Laramie | 280/47.17 |
| 5,765,843 A * | 6/1998 | Miller | 280/47.29 |
| 6,250,655 B1 | 6/2001 | Sheeks | |
| 6,308,969 B1 | 10/2001 | Young | |
| 6,663,120 B1 * | 12/2003 | Fagerqvist | 280/47.27 |

OTHER PUBLICATIONS 1-page Internet website printout listing www.tedthorsen.com, catalog p. 348, "New TT Dual Function Hand Truck", Product No. DDH500.

* cited by examiner

*Primary Examiner*—Hau Phan
(74) *Attorney, Agent, or Firm*—Natan Epstein

(57) ABSTRACT

A hand truck convertible between forward and sideways displacement has wheels individually disengageable from the hand truck frame for mounting to the frame in either a mutually parallel wheel position or a mutually in-line wheel position transverse to the parallel wheel position. An optional wheel base extension can be installed for in-line mounting of more than two wheels. Other options include a retractable stand for supporting the loaded hand truck in upright position and an auxiliary load carrying shelf. The hand truck and one or more of the optional accessories may be sold as a kit of parts.

40 Claims, 6 Drawing Sheets

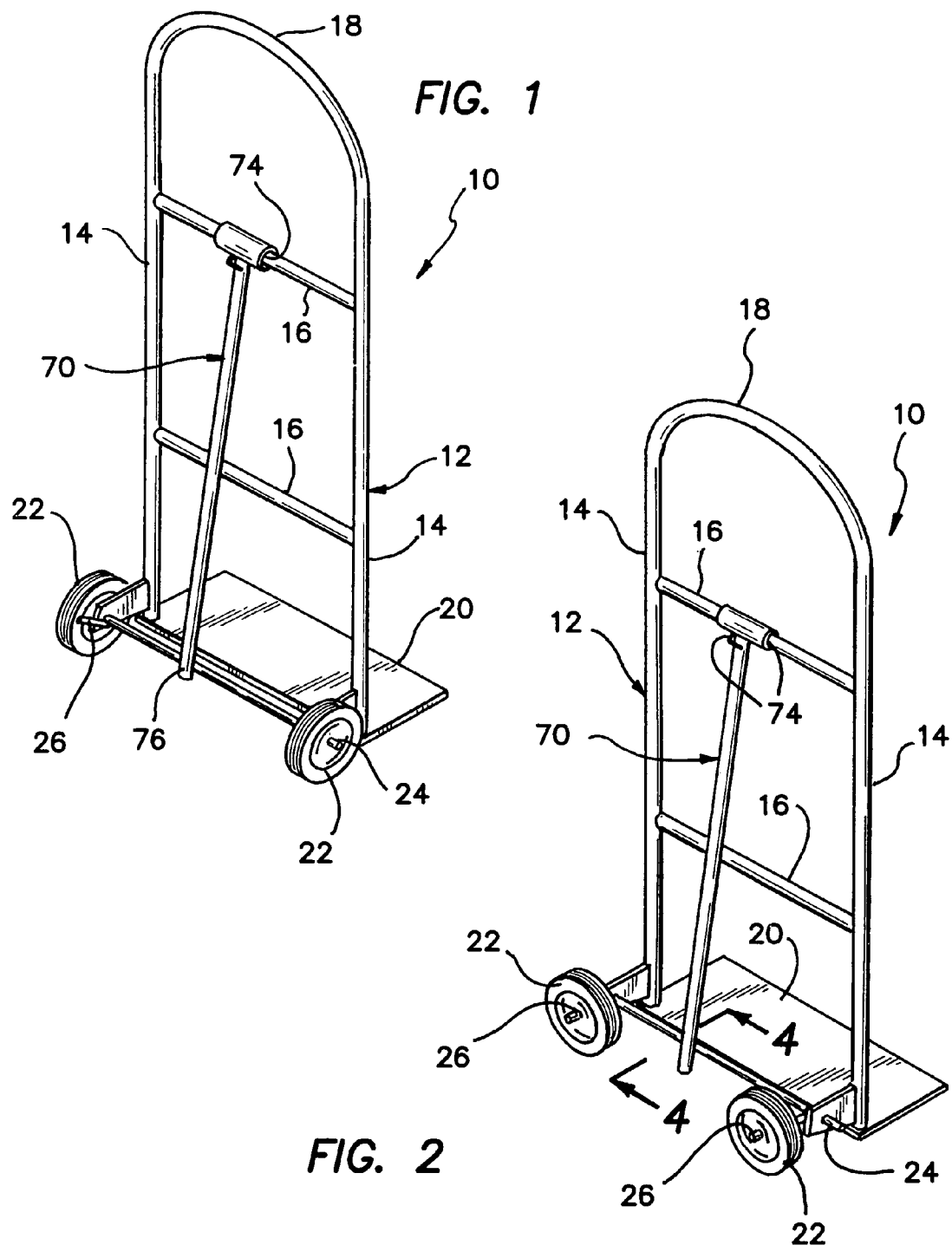

HAND TRUCK CONVERTIBLE BETWEEN FORWARD AND SIDEWAYS DISPLACEMENT

BACKGROUND OF THE INVENTION

1. Field of the Invention

The invention relates to hand trucks of the type having an upright truck frame supported on a pair of wheels and a load carrying plate projecting forwardly from the frame. Tilting of the truck frame lifts a load on the plate away from the ground surface allowing the hand truck to be rolled on its wheels for transporting the load.

2. State of the Prior Art

Conventional hand trucks typically have an upright frame of welded tubing, a flat load plate projecting forwardly from the frame and a pair of wheels mounted at the bottom of the frame on either side and just behind the plate. One common truck frame arrangement has a continuous tube bent into an inverted U-shape. The closed end of the U defines a handle at the top of the frame. The U-shaped tube has two parallel side arms which extend downwardly and have bottom ends fixed to the load plate. The parallel arms are interconnected by one or more cross-members for rigidity and strength.

In an upright standing position of the hand truck the load plate rests on an underlying ground surface and the truck frame stands erect in a generally vertical position. The parallel side arms of the frame define a vertical plane of the frame and the load plate is usually horizontal on the ground surface and perpendicular to that vertical plane. In typical use, a load is placed on the load plate while the plate is resting flat on the ground surface. The upper end of the truck frame is then pulled back so as to tilt the frame and shift the truck load onto the wheels while lifting the load plate and the load away from the ground surface. The hand truck can then be wheeled either forwards or backwards to move the load to a desired location.

Conventional hand trucks of this type are not well suited for transporting wide loads which extend substantially from each side of the truck frame when laid across the load plate. This difficulty stems from the fact that the wide load lies transversely to the direction of travel of the truck wheels. Examples of such wide loads are 4 foot by 8 foot sheets of plywood or drywall, large plates of glass, and long pipes or tubing. Such wide loads cannot be wheeled through standard sized doorways and hallways, and may be too awkward to maneuver through cluttered or crowded work areas.

A continuing need exists for an improved hand truck which retains the advantages of simplicity and low cost of conventional hand trucks yet addresses the aforementioned shortcomings.

SUMMARY OF THE INVENTION

The convertible hand truck of this invention addresses these and other shortcomings of the prior art by providing a hand truck which is convertible between forward and sideways rolling displacement. The conversion is made by dismounting and reinstalling the truck wheels between a parallel wheel configuration and an in-line wheel configuration. Tool free removal and installation of the wheels facilitates conversion of the hand truck configuration.

The convertible hand truck has a hand truck frame which preferably has left and right vertical side members interconnected by one or more cross members. The frame may have a handle at its upper end and a forwardly extending horizontal load plate at its lower end.

Two or more truck wheels are individually engageable and disengageable to the frame for rotation in either a mutually parallel wheel configuration or a mutually in-line wheel configuration transverse to the parallel wheel configuration, such that the hand truck is convertible between forward and sideways displacement.

The frame has wheel mounting shafts including a pair of axially aligned side shafts and a pair of axially parallel rear shafts. Each of the truck wheels has a shaft hole sized for receiving any of the wheel mounting shafts. In the preferred form of the invention each of the wheels is retained for rotation on the frame by a manually disengageable fastener so that the conversion can be made without use of tools. The fastener may be a manually releasable pin such as a Cotter pin inserted in a pin hole diametrically through the wheel mounting shaft.

In one form of the invention the hand truck frame defines a vertical frame plane and the load plate defines a horizontal plane perpendicular to the vertical frame plane, and the axially parallel wheel mounting rear shafts are angled to said horizontal plane such that truck wheels mounted in-line on the axially parallel wheel shafts are partly or fully lifted away from contact with a ground surface in a self-supporting standing position of the truck frame with the load plate resting on the ground surface. The truck wheels mounted on the rear shafts are brought into generally vertical load bearing contact with the ground in a reclined load carrying condition of the frame with the load plate lifted from the ground surface, such that the weight of the hand truck and its load are carried by the in-line mounted wheels.

The hand truck frame may have shaft support brackets, such as a pair of mutually parallel plates welded to the vertical side members of the frame near the load plate. The axially aligned wheel shafts or side shafts may be end portions of an axle supported between and extending through the shaft support brackets, and each axially parallel wheel shaft or rear shaft may be affixed to one of the shaft support brackets transversely to the axle. Both the rear shafts and the axle and side shafts may be welded to the shaft support brackets.

A first optional element of the improved hand truck is a wheel base extension such as a plate which is removably fastened transversely to the hand truck frame, for example, to the rear edges of the wheel mounting brackets of the truck frame. The extension is substantially longer than the spacing between the wheel mounting brackets and has a second set of wheel mounting rear shafts more widely spaced apart from each other than the first set of rear shafts provided on the frame so as to extend the in-line wheelbase of the hand truck. The wheel base extension may be in the form of a plate, such as a substantially flat plate and the second set of axially parallel rear wheel shafts are perpendicular to the plate. Attachment brackets may be also provided for fastening the wheel base extension to the shaft support brackets of the truck frame. In one form of the invention the attachment brackets are fastened to the shaft support brackets with screws passing through aligned holes in the brackets.

Each shaft support bracket on the truck frame may have a rear edge angled to the vertical plane of the truck frame and perpendicular to the axially parallel wheel shaft or rear shaft affixed to that bracket. The wheel base extension may be installed by fastening the same against the angled rear edges of the shaft support brackets, such that the rear wheel shafts of the extension are angled similarly to the first set of rear wheel shafts of the truck frame in relation to the truck frame. The wheel base extension may be perforated with holes aligned for receiving the first set of rear wheel shafts of the truck frame in an installed condition of the wheel base extension such that the first and second sets of rear shafts are parallel to each other. The second set of axially parallel rear wheel shafts may have three rear shafts including a center shaft and two end shafts equally spaced from said center shaft such that three truck wheels can be mounted on the three rear shafts of the extension in an in-line configuration. The center shaft may be slightly lower than the end shafts in an installed condition of the extension thereby providing a pivot about which the truck frame may turn.

A second optional feature is a foldable support leg pivoted to the hand truck frame and spring loaded to a normally folded condition against the frame. The support leg is extendable to a deployed condition with a lower end of the leg away from the frame for supporting the truck frame in a rearwardly tilted or reclined position. The support leg permits the hand truck to be left standing with the load leaning against the frame.

A third optional feature is a load carrier shelf removably mounted to the frame at an elevated location on the truck frame, for example, vertically intermediate between the handle and the load plate. The removable load carrier may have fasteners or retainers engageable to the vertical side members of the frame. For convenience, these fasteners may be spring clip fasteners adapted to clip onto the side members of the frame by spring force alone. Supplementary fasteners may be provided for securing the load carrier shelf more securely than might be possible with spring clips alone, if needed.

This invention also contemplates a hand truck kit of parts including a hand truck frame adapted to receive truck wheels mounted to the truck frame for rotation in either a mutually parallel configuration or an in-line configuration, a set of at least two wheels individually engageable for rotation to the frame in either configuration, and wheel fasteners for releaseably retaining the truck wheels to the frame, preferably without use of tools. The kit may also include a wheel base extension for extending the in-line wheel base of the hand truck. Optionally the kit may further include one or more load carrying shelves for attachment at one or more elevated locations of the frame.

BRIEF DESCRIPTION OF THE DRAWINGS

FIG. 1 is a perspective view of the convertible hand truck of this invention with the truck wheels in parallel configuration for forward displacement of the hand truck;

FIG. 2 is a view of the hand truck of FIG. 1 but with the wheels in in-line configuration for sideways displacement of the hand truck;

DETAILED DESCRIPTION OF THE PREFERRED EMBODIMENTS

Figure 3:
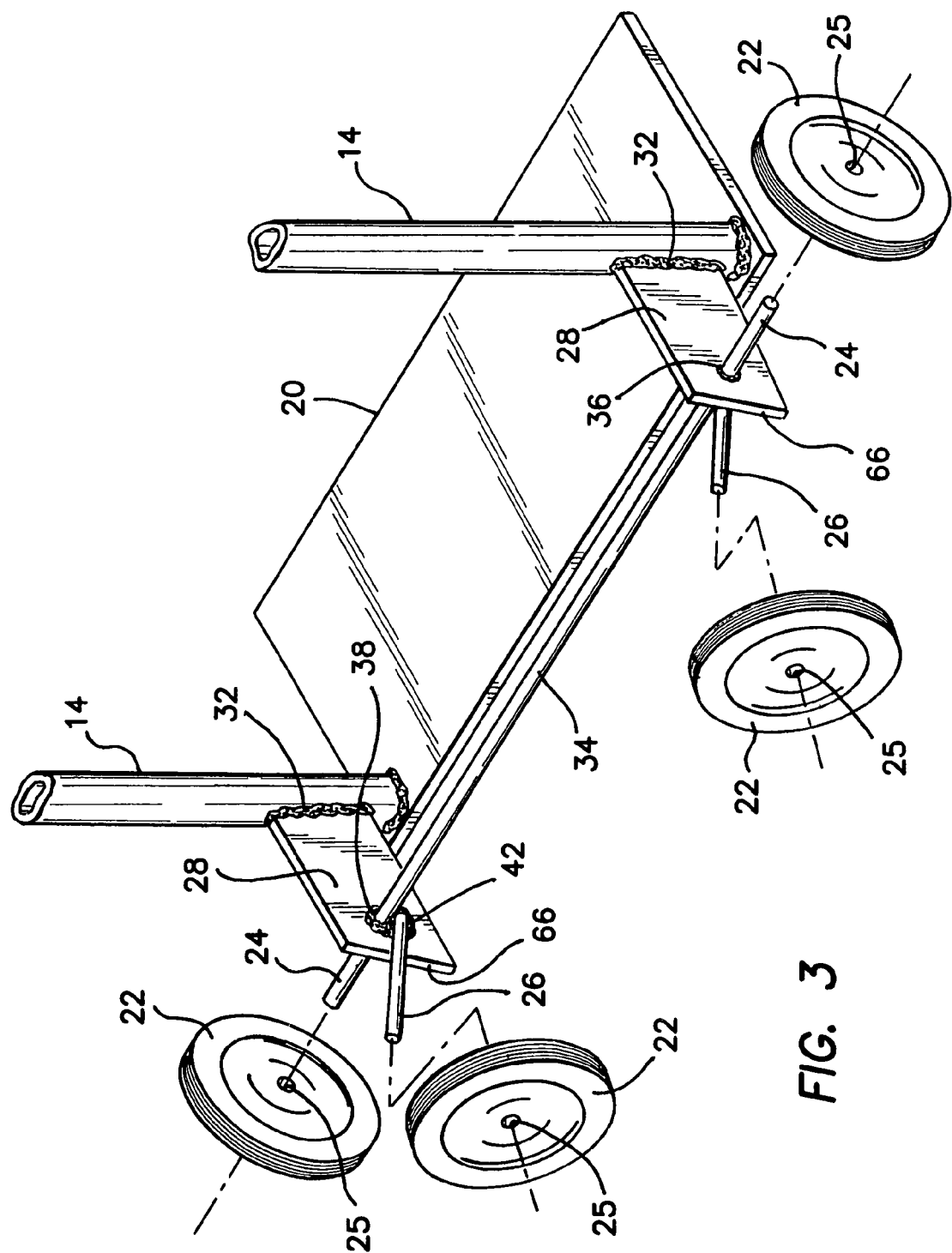
FIG. 3 is a fragmentary view of the hand truck illustrating the side and rear mounting positions of the truck wheels on the side shafts and rear shafts of the hand truck frame, with a truck wheel shown in exploded relationship to each of the shafts for purposes of illustration.

With reference to the drawings wherein like elements are designated by like numerals, FIG. 1 shows a convertible hand truck according to this invention which is generally designated by numeral 10. The convertible hand truck 10 has an upright frame 12 including a pair of parallel right and left vertical side members 14 interconnected by two cross members 16. Frame 12 has a handle 18 at its upper end and a forwardly extending horizontal load plate 20 fixed to the lower ends of the side members 14. The truck frame may be of welded tubular construction, with a single continuous length of tubing bent to an inverted U-shape form providing the two side members 14 joined at their upper ends by the handle 18, and the lower ends of the inverted U-shape welded to the load plate 20. The parallel side members 14 of truck frame 12 define a vertical frame plane and the load plate 20 lies in a horizontal plane perpendicular to the frame plane.

Two or more truck wheels 22 are individually engageable to and disengageable from the frame 12 for rotation in either a mutually parallel wheel configuration illustrated in FIG. 1, or a mutually in-line wheel configuration, depicted in FIG. 2, which is transverse to the parallel wheel configuration. The hand truck 10 is convertible between forward rolling displacement in the configuration of FIG. 1 and sideways rolling displacement in the configuration of FIG. 2. In the convertible hand truck of this invention the wheels 22 have only one of these two configurations, without any intermediate positions. In parallel configuration, the axes of rotation of the two wheels 22 mounted on opposite left and right sides of the frame 12 are aligned with each other. In the in-line configuration of the wheels 22, the wheels are mounted to the frame 12 on mutually parallel, spaced apart axes for rotation in a common plane on the rear side of the frame, behind the load plate 20.

Figure 6:
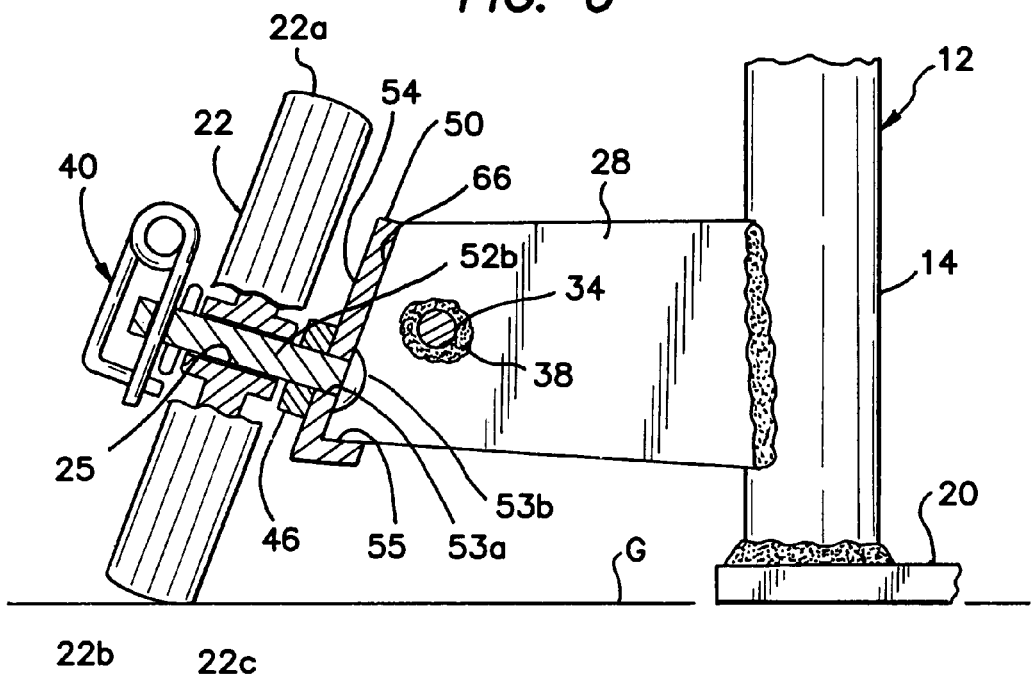
FIG. 6 is a detail view in vertical cross-section of the wheel base extension of FIG. 8 installed on the hand truck frame and showing a truck wheel mounted on the center shaft of the wheel base extension plate.

The hand truck frame 12 has a pair of axially aligned side wheel shafts 24 for rotatably supporting the truck wheels 22 in the mutually parallel position of FIG. 1 and a first set of axially parallel rear wheel shafts 26 for rotatably supporting the truck wheels 22 in the in-line wheel position of FIG. 2. Each truck wheel 22 has a shaft hole 25 passing axially through the center of the wheel, as best seen in FIG. 6, for receiving any of the wheel shafts 24 and 26 of the frame 12.

Turning now to FIG. 3, the hand truck frame 12 includes wheel shaft support brackets 28 in the form of mutually parallel plates. Each bracket has a front edge 32 which is fixed as by welding longitudinally to one of the side members 14 above the load plate 20. An axle 34 is supported between the two brackets 28 transversely to the planes of the brackets and extends through axle holes 36 in the brackets 28 such that opposite end portions of the axle provide the pair of axially aligned side shafts 24 on either side of the truck frame 12. The axle 34 with side wheel shafts 24 may be welded to each bracket as at 38 to lock the axle and side wheel shafts against rotation relative to the frame 12. The first set of axially parallel rear shafts 26 are fixed as by welding 42 to the support brackets 28.

Figure 7:
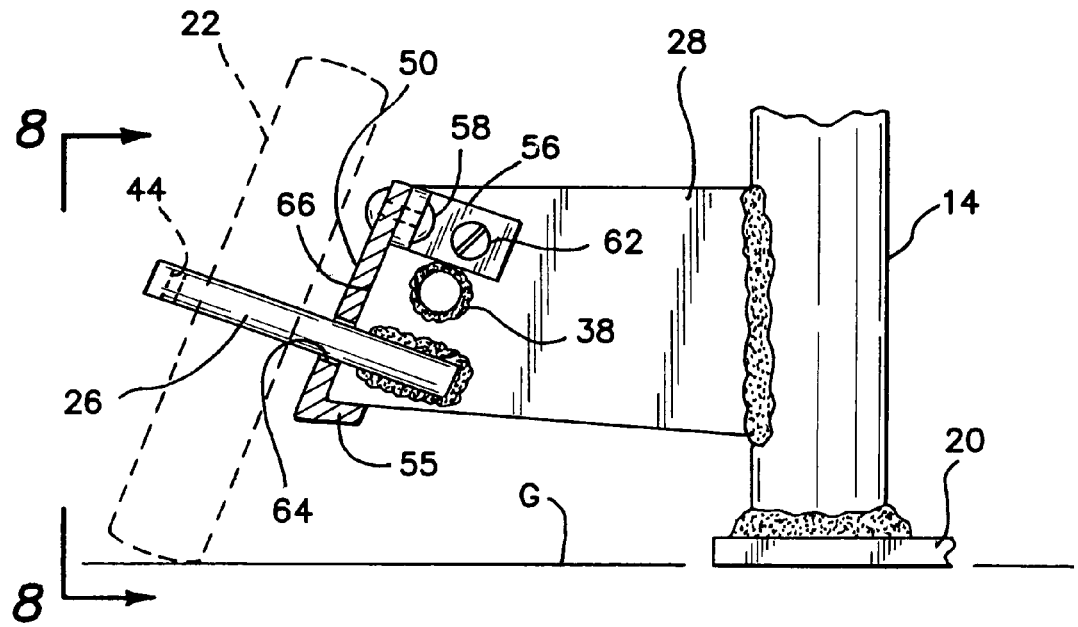
FIG. 7 is a vertical section of the wheel base extension of FIG. 8 showing one attachment bracket of the extension fastened to a shaft support bracket of the truck frame and also illustrating how the rear shaft of the shaft support bracket passes through a shaft hole in the extension when the extension is installed against the inclined rear edge of the bracket.

Any one of the truck wheels 22 can be mounted to any of the wheel shafts 24, 26 by inserting the free end of the shaft through the shaft hole 25 of the wheel and retaining the wheel on the shaft with a suitable fastener. The preferred fastener is manually disengageable such that the hand truck is convertible between forward and sideways rolling displacement without use of tools. A presently preferred manually releaseable fastener for this purpose is a Cotter pin 40 inserted in a pin hole 44 passing diametrically through the wheel shaft, as best illustrated in FIGS. 6 and 7. It is preferred to also provide a spacer or washer 46 axially supported on the shaft between the wheel 22 and the support bracket 28 in order to space the wheel away from contact with the bracket.

Figure 4:
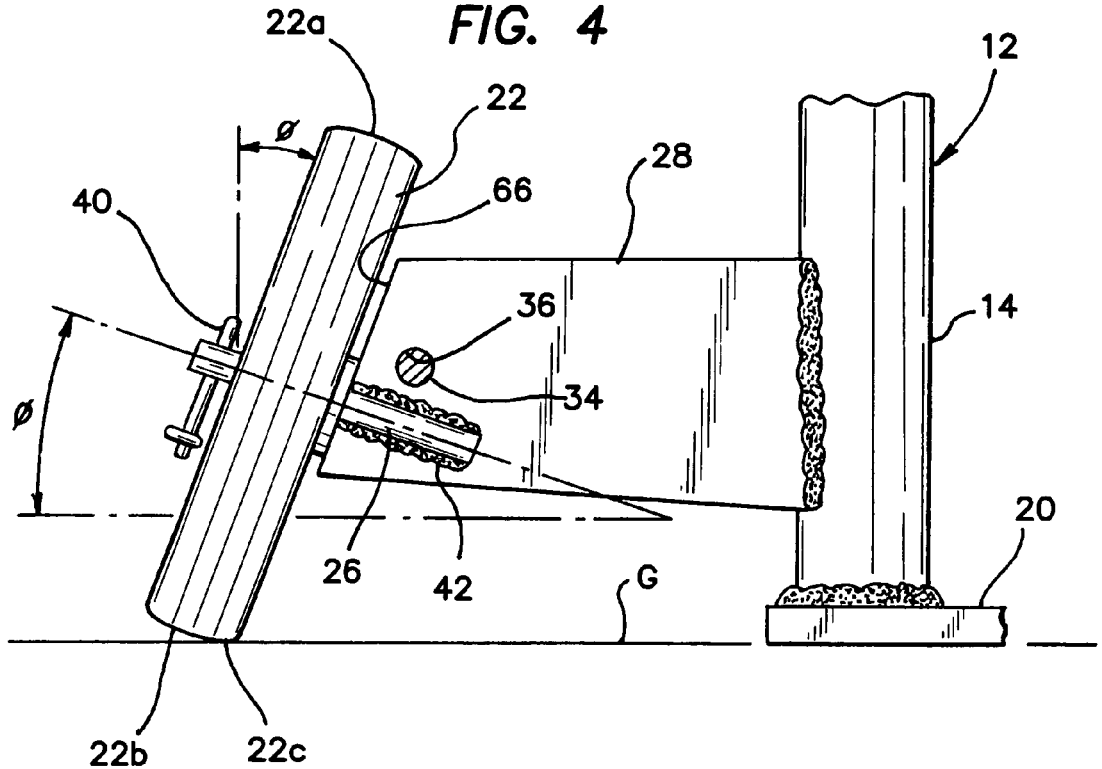
FIG. 4 is a detail view showing the angling of the rear shaft relative to the vertical side member of the truck frame and the resulting inclined in-line mounting of a truck wheel on the rear shaft as well as the angled rear edge of the corresponding shaft support bracket for accommodating the angled position of the wheel.
Figure 5:
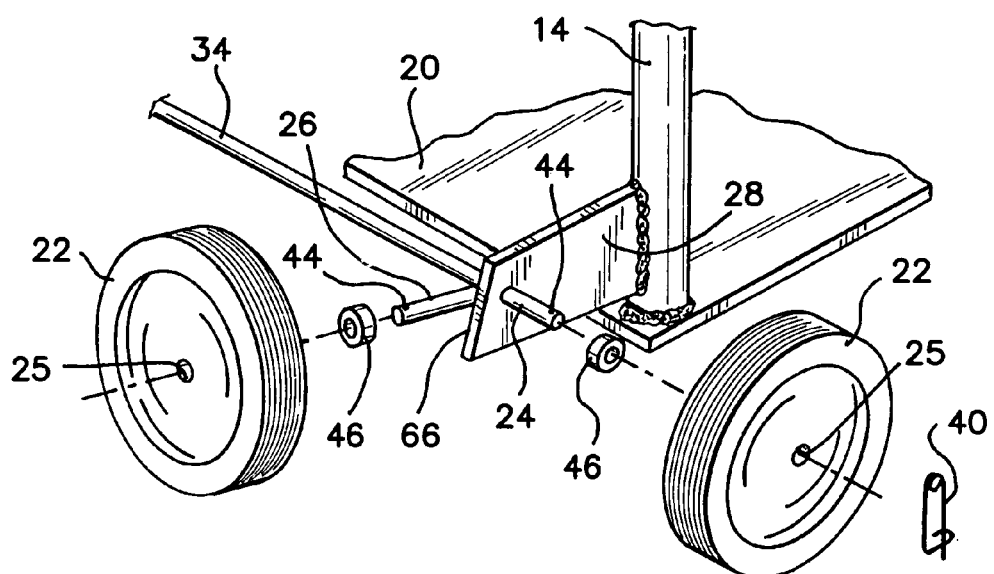
FIG. 5 is an exploded detail perspective view showing the spacer washer and Cotter pin used in the installation of a truck wheel on the right side wheel shaft of the hand truck.

As best seen in FIG. 4 the rear shafts 26 are angled to the horizontal plane of the load plate 20 at an angle φ. When the truck wheels 22 are mounted on the first set of axially parallel rear wheel shafts 26 the plane of the wheels 22 also lies at the same angle φ away from the vertical plane of the truck frame 12, with the top 22a of the wheel inclined towards the truck frame 12. The bottom 22b of the wheel preferably rests on an inside edge 22c on underlying ground surface G, or is raised slightly above the ground surface G, when the truck frame 12 is in a standing position with load plate 20 resting on the ground surface. By pulling back the truck frame 12 to a reclined load bearing position, such as suggested in FIG. 10, the in-line mounted wheels 22 can be brought to a load bearing generally vertical rolling position on the ground surface G and the load plate 20 is lifted away from the ground surface, thereby shifting the load onto the wheels. In this condition the in-line mounted truck wheels 22 can roll on the ground surface G in a generally vertical plane while the load plate 20 is upwardly inclined and a load L supported on the load plate tends to lie against the parallel side members 14 and cross members 16, and the weight of the hand truck 10 and its load is carried by the in-line mounted truck wheels 22. In the in-line configuration of the truck wheels the hand truck 10 is useful as a panel cart for carrying a load L of plywood, drywall or other paneling and relatively large sheet materials.

Figure 8:
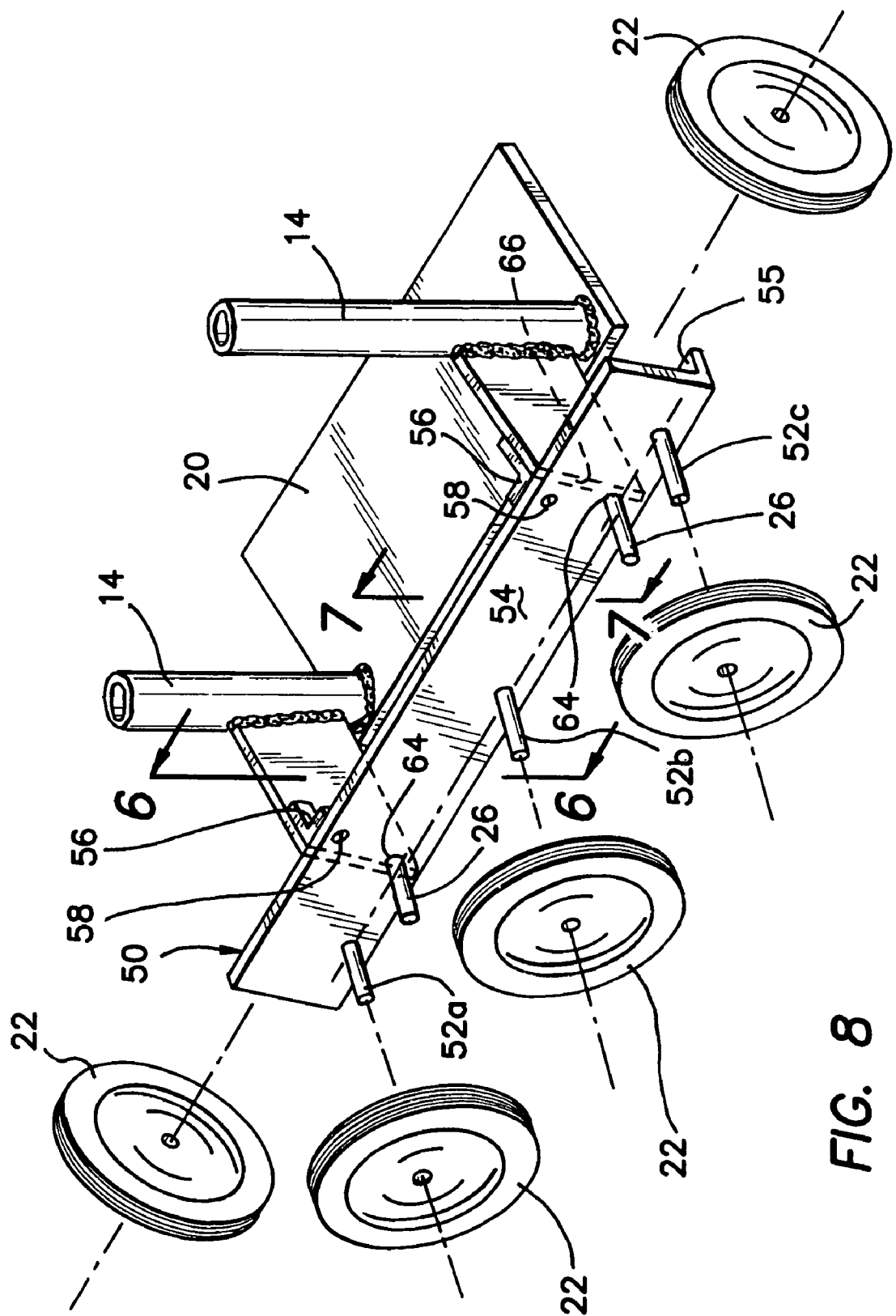
FIG. 8 is an exploded perspective showing a wheel base extension fastened to the shaft support brackets to achieve an extended in-line wheel base, and truck wheels shown in exploded relationship to each of the two side shafts of the frame and three rear shafts of the extension.
Figures 9, 10:
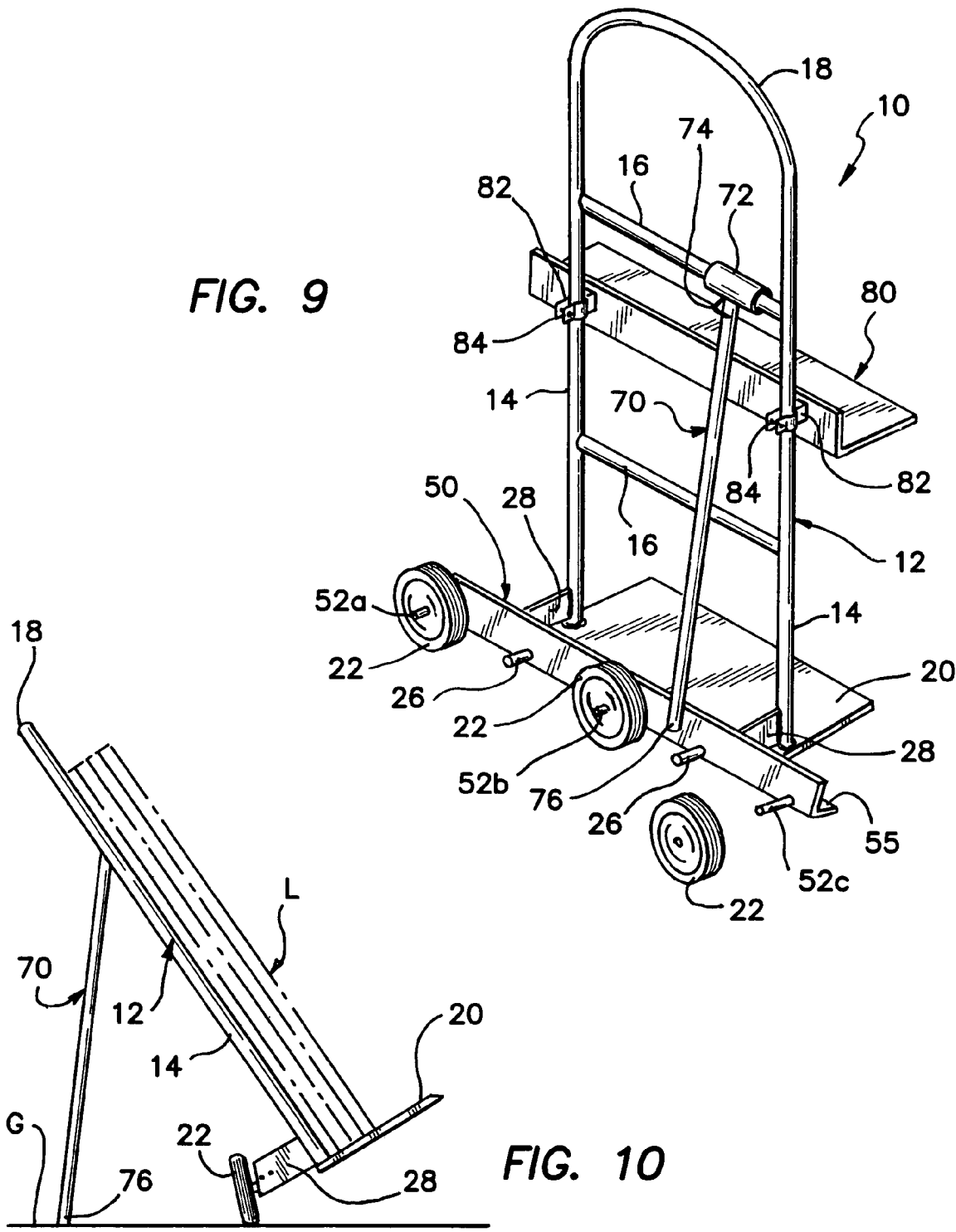
FIG. 9 is a perspective view of the convertible hand truck of FIG. 1 equipped with the wheel base extension of FIG. 8 and an optional swing leg and removable load shelf.
FIG. 10 is a side view of the hand truck of FIG. 9 with the load shelf removed and supported with a load in a reclined position by deployment of the swing leg.

An optional accessory of the hand truck 10 is a wheel base extension in the form of wheel base extension 50 best seen in FIGS. 8 and 9. The extension may be a generally flat plate 50 supported on brackets 28 but having a plate length substantially greater than the spacing between the brackets 28. The extension 50 supports a second set of axially parallel rear shafts 52a, 52b, 52c fixed in perpendicular relationship to a rear facing surface 54 of the plate 50. Each shaft 52a,b,c may be set in a corresponding mounting hole 53a and welded in place as at 53b in the cross section of FIG. 6. Preferably the second set of rear shafts consists of three rear shafts including a center shaft 52b and two end shafts 52a, 52c equally spaced apart from the center shaft. The end shafts 52a, 52c on the extension plate 50 are more widely spaced apart from each other in a horizontal direction along extension plate 50 than the spacing between the first set of rear shafts 26 on brackets 28. Consequently, truck wheels 22 mounted on the end shafts provide a longer in-line wheelbase than wheels 22 mounted on the two rear shafts 26.

The extension plate 50 is adapted for removable attachment to the wheel shaft support brackets 28 by means of attachment brackets 56 fixed to the extension plate as with rivets 58 and fastened to shaft support brackets with screws 62 passing through aligned holes in the attachment and support brackets, as seen in FIGS. 7 and 8. The extension plate 50 is perforated with shaft holes 64 aligned for receiving the first set of rear wheel shafts 26 in an installed condition of the plate 50 on the shaft support brackets 28, as shown in FIGS. 7 and 8. As seen in FIG. 8 one shaft hole 64 is provided intermediate the center shaft 52b and each of the end shafts 52a, 52c. The extension plate 50 may have an underlip 55 which may run the length of extension plate 50 and fits under the support brackets 28 to help support the weight of the truck 10 in the in-line configuration of the truck 10 and to partially relieve the load on the attachment brackets 56.

Up to three wheels 22 can be mounted in in-line position on the three shafts of the extension plate 50. In one form of the invention, the center shaft 52b is slightly lower than the two end shafts 52a, 52b on the extension plate 50 such that a wheel 22 mounted on the center shaft 52b can serve as a pivot with a pivot axis generally along the middle of the truck frame 12. By balancing the truck frame 12 on the center mounted wheel 22 and with the end wheels 22 raised slightly above the ground surface G the hand truck 10 can be turned generally in place so as to change the direction of sideways displacement of the hand truck.

Each support bracket 58 has a rear edge 66 which forms an angle φ with the vertical similar to the same angle φ of the in-line mounted wheels 22 in FIGS. 4 and 6. In its installed condition depicted in FIGS. 6–8, the extension plate 50 lies against the rear edges 66 at this same angle φ. As a result, the rear shafts 52a,b,c, which are perpendicular to the plate 50 are parallel to the first set of rear shafts 26 and are angled relative to the load plate 20 and the truck frame 12 at angles similar to those of rear shafts 26 on support brackets 28. Truck wheels 22 mounted on the second set of rear shafts 52a,b,c are consequently inclined to the vertical at the same angle φ. In a resting condition of the load plate 20 upon ground surface G as shown in FIG. 6, the wheel edge 22c nearest to the truck frame 12 preferably contacts the ground G and serves as a pivot upon which the weight of the hand truck 10 and any load thereon is transferred entirely onto the wheels 22 when the truck frame 12 is pulled back to a reclined condition for lifting the load plate 20 away from the ground surface and the wheels 22 are brought to a generally vertical position with wheel bottoms 22b in contact with the ground surface G.

A second optional feature of the convertible hand truck 10 is a foldable, swing-out support leg 70 which is supported by sleeve 72 on the upper cross member 16 of the truck frame 12. The sleeve 72 turns about cross member 16, and a coil spring 74 captive between the support leg 70 and the cross member 16 applies torsional force normally urging the lower end 76 of the support leg to a folded or retracted condition against the frame 12 of the hand truck, as depicted in FIGS. 1 and 9. The leg 70 can be swung away from the truck frame 12 against the force of spring 74 to a deployed position illustrated in FIG. 10 for supporting the hand truck 10 on a ground surface G in a reclined position conducive to supporting a load L in stable position against the hand truck frame 12 and load platform 20. It will be noted in FIG. 10 that wheel 22 rests on ground surface G in a generally upright vertical condition brought about by the reclined position of the hand truck frame 12.

A third optional feature depicted in FIG. 9 is the provision of a load carrying shelf 80 removably mounted to the truck frame 12 at a location vertically intermediate to the handle 18 and the load plate 20. In FIG. 7, the load carrying shelf 80 is shown supported on the side members 14 at a height between the upper and lower cross members 16. The removable load carrier 80 has fasteners 82 each of which engages a corresponding vertical side member 14 of the truck frame. Each fastener 82 is a spring clip fastener, generally U-shaped, with the base of the U secured to the load carrier 80 and the open end of the U configuration resiliently spread apart to receive the vertical member 14 of the frame. For greater security, where heavy loads are to be carried on the shelf 80, a supplemental fastener 84 may be provided to hold the open end of the U-shaped fastener 82 from spreading open. The supplemental fasteners 84 may take the form of bolts inserted across the open end of each fastener 84, along with a nut threaded on the end of the bolt for holding the arms of the fastener tightly against the vertical member 14.

This invention also contemplates a hand truck kit of parts which includes a combination of some or all of the elements and optional features identified above. For example, the kit in one embodiment may include the hand truck frame 12 with the load plate 20 and a set of at least two wheels 22 including a sufficient number of wheel fasteners such as fasteners 40. In a more complete embodiment of the kit, the hand truck kit of parts may further include a wheel base extension 50 such as shown in FIG. 9 for extending the in-line wheel base of the hand truck 10 and a set of at least three wheels 22 with corresponding wheel fasteners. In a still more complete form of the hand truck kit of parts, one or more load carrying shelves 80, shown in FIG. 9, are also included in the kit.

Preferred and alternate embodiments of the invention have been described and illustrated for purposes of clarity and example only. It should be understood that still other changes, modifications and substitutions to the described embodiments will be apparent to those having only ordinary skill in the art without thereby departing from the scope of the invention, which is defined by the following claims.

What is claimed is:

1. A hand truck comprising a hand truck frame including a plurality of vertical members interconnected by a plurality of cross members, said frame having an upper end, a lower end, a front side and a rear side, a handle at said upper end, and a forwardly extending horizontal load plate at said lower end, two or more wheels mounted for rotation to said frame, a pair of axially aligned wheel shafts for rotatably supporting said wheels in a mutually parallel position and a first plurality of axially parallel wheel shafts for rotatably supporting said wheels in a mutually in-line wheel position, each of said wheels being individually disengageable from said frame for mounting to the frame in either said mutually parallel wheel position or a mutually in-line wheel position transverse to said parallel wheel position, such that the hand truck is convertible between forward and sideways displacement.

2. The hand truck of claim 1 wherein each of said wheels is retained to said frame by a manually disengageable fastener such that the hand truck is so convertible without use of tools.

3. The hand truck of claim 1 wherein each said wheel is retained to said frame by a manually releaseable Cotter pin.

4. The hand truck of claim 1 wherein each of said wheels has an axle hole sized for receiving any of said wheel shafts.

5. The hand truck of claim 4 wherein each of said wheel shafts is diametrically perforated for passing a wheel retaining pin.

6. The hand truck of claim 5 wherein said wheel retaining pin is a Cotter pin.

7. The hand truck of claim 1 further comprising a frame width extension having a second plurality of wheel shafts more widely spaced than said first plurality of wheel shafts thereby to extend the wheelbase of the hand truck in said in-line wheel condition.

8. The hand truck of claim 1 wherein said frame defines a vertical frame plane and said load plate lies in a horizontal plane perpendicular to said frame plane, and said first plurality of axially parallel wheel shafts are angled to said horizontal plane such that said wheels mounted on said first plurality of axially parallel wheel shafts are inclined relative to an underlying ground surface in a self-supporting standing position of said frame with said load plate resting on the ground surface, said first plurality of axially parallel wheel shafts being arranged on said frame such that said wheels mounted on first plurality of axially parallel wheel shafts are brought into a generally vertical load bearing position in a reclined load carrying condition of said frame with said load plate lifted from the ground surface.

9. The hand truck of claim 1 wherein said frame comprises shaft support brackets, said axially aligned wheel shafts being end portions of an axle supported between and extending through said brackets, and each said axially parallel wheel shaft being affixed to one of said brackets transversely to said axle.

10. The hand truck of claim 9 wherein each said axially parallel wheel shaft is welded to a corresponding one of said brackets.

11. The hand truck of claim 9 wherein said axle is welded to said brackets.

12. The hand truck of claim 9 wherein said shaft support brackets are mutually parallel plates each bracket having a rear edge perpendicular to a said axially parallel wheel shaft affixed to said bracket.

13. The hand truck of claim 9 further comprising a width extension plate having a second plurality of axially parallel wheel shafts affixed to said plate, said plate being adapted for removable attachment to said shaft support brackets.

14. The hand truck of claim 13 wherein said plate is a substantially flat plate and said second plurality of axially parallel wheel shafts are perpendicular to said plate.

15. The hand truck of claim 13 wherein said plate has attachment brackets for fastening to said shaft support brackets.

16. The hand truck of claim 15 wherein said attachment brackets are fastened to said shaft support brackets with screws passing through aligned holes in said brackets.

17. The hand truck of claim 13 wherein said width extension plate is perforated with holes aligned for receiving said first plurality of wheel shafts in an installed condition of said plate on said shaft support brackets.

18. The hand truck of claim 13 wherein said second plurality of axially parallel wheel shafts comprises three shafts including a center shaft and two end shafts equally spaced from said center shaft such that three wheels can be mounted on said three shafts in said in-line position.

19. The hand truck of claim 18 wherein said center shaft is slightly lower than said end shafts on said plate in said installed condition such that said frame can be turned on one wheel mounted on said center shaft as a pivot wheel for said frame.

20. The hand truck of claim 18 wherein said width extension plate is perforated with holes aligned for receiving said first plurality of wheel shafts in an installed condition of said plate on said shaft support brackets, said holes being intermediate said center shaft and each of said end shafts.

21. The hand truck of claim 20 wherein said plate is mounted to said frame with said second plurality of shafts parallel to said first plurality of shafts.

22. The hand truck of claim 9 wherein said shaft support brackets are affixed to said vertical members of said frame above said load plate.

23. The hand truck of claim 1 further comprising a leg spring loaded to a normally folded condition against said frame, said leg being movable to a deployed condition away from said frame for supporting said frame on an underlying ground surface in a rearwardly tilted position of the frame.

24. The hand truck of claim 1 further comprising a load carrier removably mounted to said frame at a location intermediate to said handle and said load plate.

25. The hand truck of claim 24 wherein said load carrier has fasteners engageable to said vertical elements.

26. The hand truck of claim 25 wherein said fasteners are retained to said vertical elements by spring force alone.

27. A hand truck comprising a hand truck frame including parallel side members connected by one or more cross members and having lower ends fixed to a forwardly extending load plate, a pair of side wheel shafts and a pair of rearwardly extending rear wheel shafts on said frame, and wheels engageable for rotation interchangeably between said side wheel shafts in a mutually parallel wheel position and said rear wheel shafts in a mutually in-line wheel position transverse to said parallel wheel position, such that the hand truck is convertible between forward and sideways displacement.

28. The hand truck of claim 27 wherein said frame defines a vertical frame plane and said rear wheel shafts are angled on said frame relative to a plane of said load plate such that said wheels turn in a plane inclined to said vertical when the wheels are mounted on said rear wheel shafts in said in-line wheel position such that said wheels are at least partly lifted away from contact with a ground surface in an upright standing position of said frame with said load plate resting on the ground surface, and said wheels are brought into generally vertical ground contact in a reclined load carrying condition of said frame with said load plate lifted away from the ground surface for carrying the weight of said truck frame and a load on said frame.

29. The hand truck of claim 27 further comprising a wheelbase extension substantially longer than a spacing between said side members and having additional rear wheel shafts thereon more widely spaced apart than said rear wheel shafts on said frame thereby to provide an extended wheelbase of the hand truck in said in-line wheel position.

30. The hand truck of claim 27 further comprising a leg spring loaded to a normally folded condition against said frame, said leg being movable to a deployed condition away from said frame for supporting said frame on an underlying ground surface in a rearwardly tilted position of the frame.

31. The hand truck of claim 27 further comprising a load carrier removably mounted to said frame at a location intermediate to said handle and said load plate.

32. A hand truck comprising a hand truck frame including a pair of vertical members interconnected by cross members, said frame having an upper end and a lower end, a forwardly extending horizontal load plate at said lower end, a pair of shaft support brackets affixed to said vertical members, an axle supported on said brackets and terminating in opposite end shafts, a rear shaft on each of said brackets, said shaft extending away from said frame and transversely to said axle, and truck wheels interchangeably mounted for rotation on said opposite end shafts or said rear shafts, such that the hand truck is convertible between forward and sideways displacement on said wheels.

33. The hand truck of claim 32 wherein each of said wheels is retained to a corresponding one of said shafts by a manually disengageable fastener such that the hand truck is so convertible without use of tools.

34. The hand truck of claim 32 further comprising a Cotter pin inserted diametrically through a pin hole in any of said shafts for retaining thereon one of said wheels between said Cotter pin and one of said brackets.

35. The hand truck of claim 32 further comprising a spacer on any of said shafts between one of said wheels and one of said brackets.

36. The hand truck of claim 32 wherein said rear shafts are angled on said frame such that said wheels mounted on said rear shafts are lifted away from contact with a ground surface in a self-supporting standing position of said frame with said load plate resting on the ground surface and such that said wheels are brought into approximately vertical ground contacting relationship in a reclined load carrying condition of said frame with said load plate lifted from the ground surface.

37. The hand truck of claim 32 further comprising a wheel base extension having at least two wheel mounting shafts affixed thereon and fasteners for securing said extension to said brackets, said least two wheel mounting shafts being more widely spaced apart from each other than a mutual spacing between said rear shafts.

38. The hand truck of claim 36 wherein said wheel base extension is a plate and said least two wheel mounting shafts are perpendicular to said plate, and said plate is fastened to said brackets such that said least two wheel mounting shafts are parallel to said rear shafts.

39. The hand truck of claim 32 wherein said brackets are mutually parallel plates, each of said brackets is affixed to one of said vertical members and each of said rear shafts is affixed to an inside surface of a corresponding one of said brackets.

40. The hand truck of claim 39 wherein each of said brackets has a rear edge perpendicular to a said rear shaft affixed to said bracket.

\* \* \* \* \*